Sept. 23, 1958 C. W. UPTON, JR 2,853,584
SEALED DEVICE
Filed March 29, 1955 4 Sheets-Sheet 1

WITNESSES:
Robert C Baird
W. R. Crout

INVENTOR
Chester W. Upton, Jr.,
BY
Ralph H Swingle
ATTORNEY

Sept. 23, 1958 C. W. UPTON, JR 2,853,584
SEALED DEVICE
Filed March 29, 1955 4 Sheets-Sheet 2
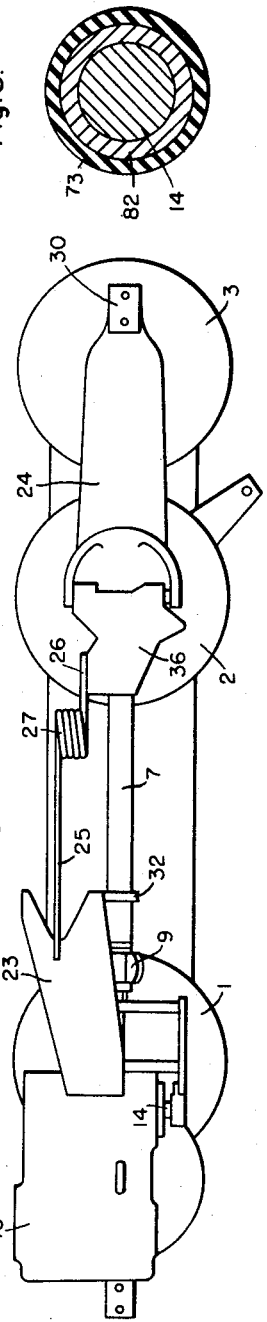
Fig.2.
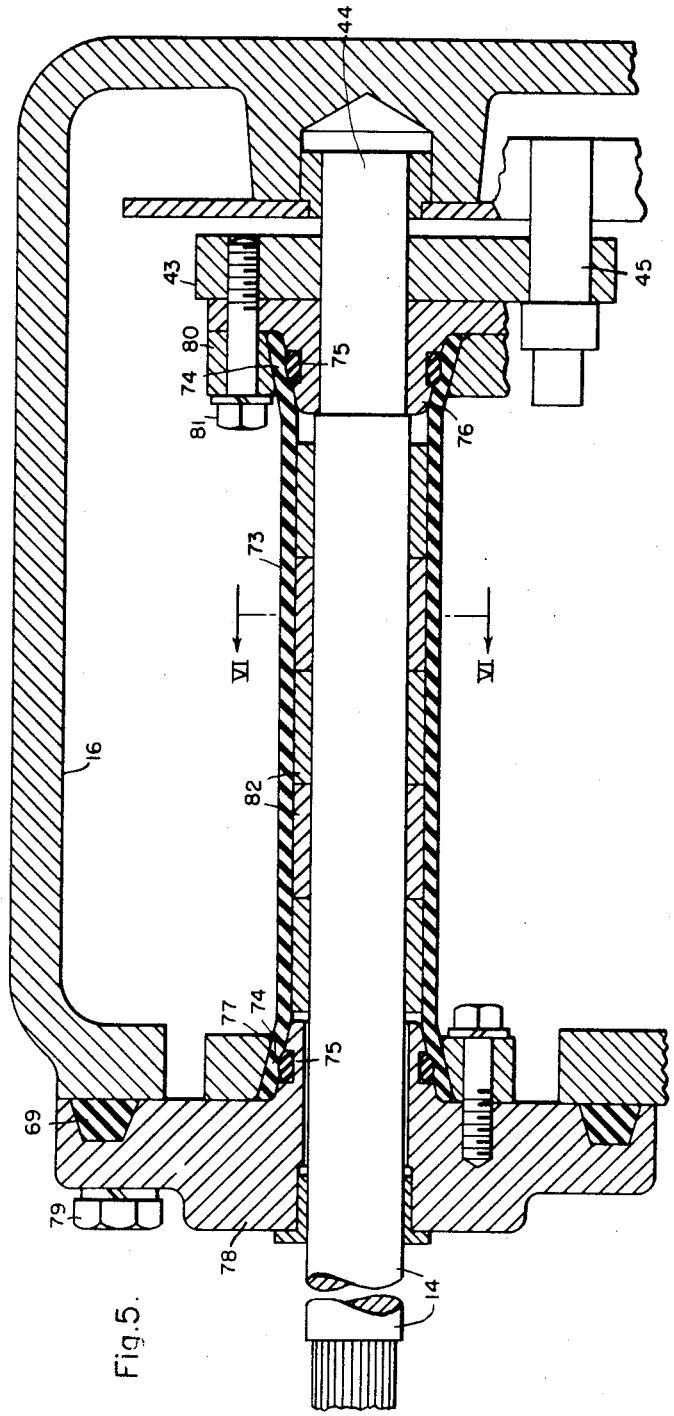
Fig.6.
Fig.5.

Sept. 23, 1958  C. W. UPTON, JR  2,853,584
SEALED DEVICE
Filed March 29, 1955  4 Sheets-Sheet 3

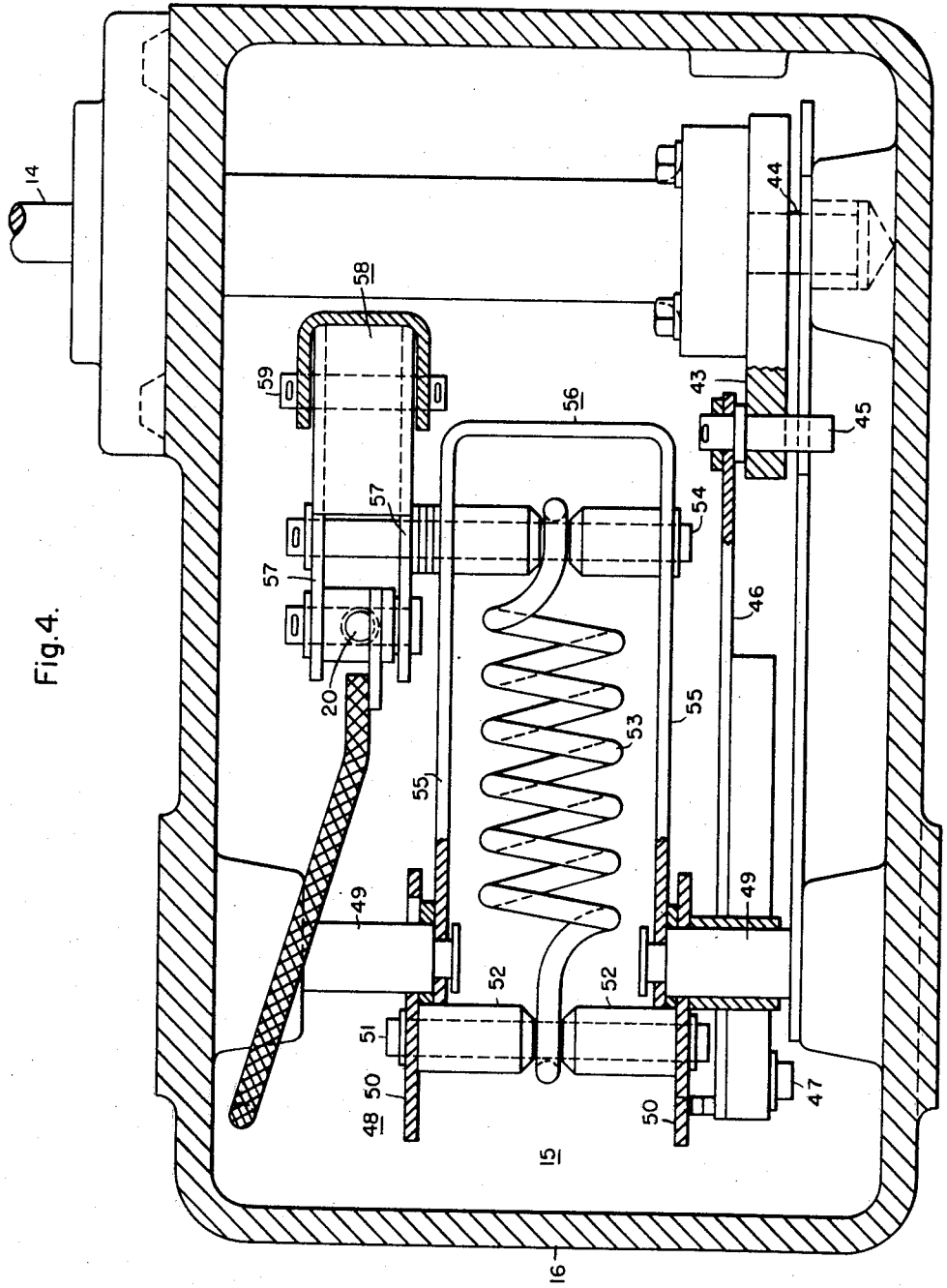

United States Patent Office 2,853,584
Patented Sept. 23, 1958

2,853,584
SEALED DEVICE

Chester W. Upton, Jr., Penn Township, Westmoreland County, Pa., assignor to Westinghouse Electric Corporation, East Pittsburgh, Pa., a corporation of Pennsylvania Application March 29, 1955, Serial No. 497,524

9 Claims. (Cl. 200—149)

This invention relates to sealed devices in general, and, more particularly, to sealed circuit interrupting devices having a rotatable, or movable shaft extending interiorly within a sealed container or casing.

A general object of my invention is to provide an improved sealed device in which there will be assurance that there will be no fluid leakage along a rotatable, or movable shaft member.

Although my invention has application to sealed devices in general, in which a rotatable, or movable shaft member extends interiorly within a sealed container or casing, it solves a particular problem in a sealed load-break disconnecting switch of the general type set out in United States patent application, filed October 26, 1951, Serial No. 253,321, now United States Patent 2,769,063, issued October 30, 1956, to Harry J. Lingal, and assigned to the assignee of the instant application. In this patent there is disclosed and claimed a novel circuit interrupting device utilizing a sealed container or casing, in which is disposed sulfur hexafluoride gas, the remarkable arc-extinguishing characteristics of which are set out and described in United States patent application, filed July 19, 1951, Serial No. 237,502, now United States Patent 2,757,261, issued July 31, 1956 to Harry J. Lingal, Thomas E. Browne, Jr., and Albert P. Strom, and likewise assigned to the assignee of the instant application.

In the aforesaid Lingal interrupting device, an interrupting structure of the sealed-casing type is associated with a somewhat conventional disconnecting switch structure, in which opening motion of the disconnecting switch blade is employed to effect a slight rotative movement of an operating shaft, which extends interiorly within the sealed casing to actuate the contact separating mechanism therein. Since gas under pressure is sealed within the casing, and since during use it is desirable to prevent leakage of such gas, it is necessary to provide a seal along the rotatable shaft to prevent gas leakage therealong.

As set out in the aforesaid patent, a rubber-like, flexible sleeve encircles the operating shaft. One end of the rubber-like sleeve is secured adjacent the inner end of the rotatable shaft in gas-tight connection thereto. The other end of the flexible, rubber-like sleeve is clamped to the casing itself so that during operation of the interrupter, and hence during rotative motion of the operating shaft, the flexible, rubber-like sleeve is subjected to twisting or torsional stress.

It has been discovered that during the use of such equipment in very low ambient temperatures that the flexible, rubber-like sleeve, which has been made of polychloroprene, loses its ability to maintain a gas-tight seal at temperatures slightly below 0° F. It is a further object of my invention to remedy this situation by utilizing in conjunction with the gas-impermeable polychloroprene seal an additional seal of a material which retains its sealing flexibility at very low temperatures. This additional seal has been formed of a silicone elastomer.

The simple substitution of a silicone elastomer for the polychloroprene sleeve is not practical since the silicone elastomer, when fabricated with conventional techniques, is permeable to the sulphur hexafluoride gas. The silicone elastomer seal described in this invention can readily be produced with a density sufficient to eliminate objectionable permeability. It is, therefore, a further object of my invention to provide a gas-tight, or fluid-tight seal, which will remain fluid tight at both extremely high and low temperatures, and which will combine the advantages of the considerable flexibility of the silicone elastomer at low temperatures with the advantage of the polychloroprene sleeve with its non-permeable characteristics.

Further objects and advantages will readily become apparent upon reading the following specification, taken in conjunction with the drawings; in which:

Fig. 2 is a top plan view of the load-break disconnecting switch of Fig. 1, with the contact structure shown closed;

Fig. 4 is an enlarged, inverted plan view taken substantially along the line IV—IV of Fig. 3;

Fig. 5 is an enlarged, vertical sectional view taken along the operating shaft through the top housing casting, substantially along the line V—V of Fig. 3;

Fig. 6 is a sectional view taken along the line VI—VI of Fig. 5; and,

Figure 1:
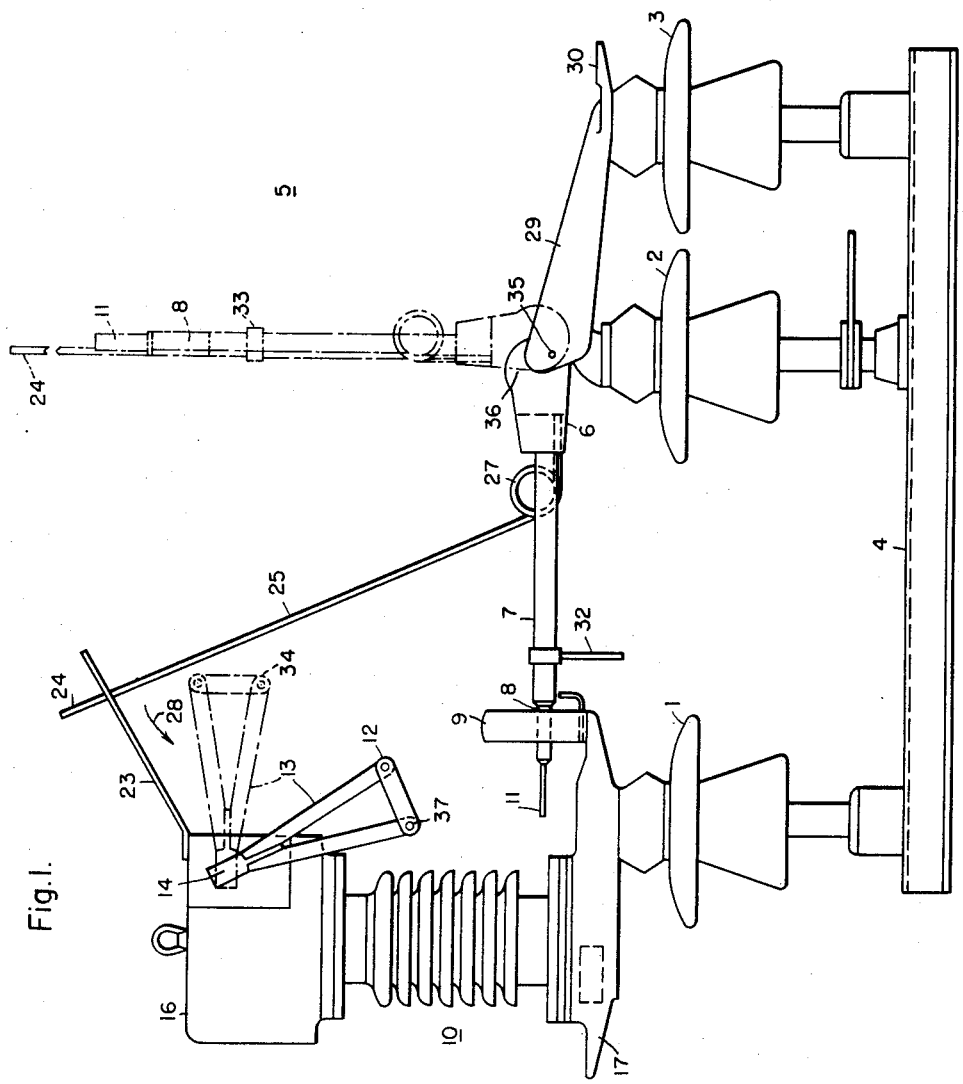
Fig. 1 is a side elevational view of a load-break disconnecting switch, the contact structure being illustrated in the closed-circuit position.

Referring to the drawings, and more particularly to Fig. 1 thereof, the reference numerals 1—3 designate supporting porcelains, which extend, in this particular instance, vertically upwardly from a channel-shaped base member 4. As well known by those skilled in the art, the circuit interrupter 5 may be mounted in either the horizontal position, as shown, or in an inverted position, or in a vertical position, depending upon the application requirements. Naturally, the particular mounting arrangement has nothing to do with my invention, and for purposes of illustration, the load break switch is illustrated in a horizontal position. The supporting porcelain 2 is rotatable, and, when rotated, serves to actuate a mechanism provided within a housing 6 to effect first an axial rotative movement of the main switch moving contact or blade 7 about its axis to reduce contact pressure between the end 8 of the switch blade 7 and the stationary main switch jaws 9, meanwhile breaking any ice which may have formed thereat.

Subsequently, the mechanism disposed interiorly within the housing 6, when actuated by rotative motion of the rotatable insulator column 2, serves to bodily rotate the main switch moving contact 7 upwardly away from the main stationary switch jaw contacts 9, separating therefrom so that the circuit will then be compelled to pass through a circuit interrupting device 10, which is mounted adjacent the switch jaws 9 upon supporting insulator 1. The tip end 11 of the main switch blade 7 strikes a laterally jutting projection 12 disposed at the end of a crank arm 13 to effect rotation of a drive or operating shaft 14 to effect operation of an over-center toggle spring mechanism 15, disposed interiorly within a housing 16 positioned at the upper end of the interrupting device 10.

During the time that the main switching blade 7 has separated from the jaw contacts 9, the main circuit extends from the terminal pad 17 to the relatively stationary contact 18 (Fig. 3), thence by way of the movable contact 19 and through lift rod 20 to flexible connection 21, the other end of which is secured, as at 22, to a portion of the conducting housing 16. An upper stationary terminal 23, more clearly shown in Fig. 1, has a forked outer end, not shown, which receives the end 24 of the interrupter isolating blade 25, which is secured, as at 26, (Fig. 2) to a side wall of the housing 6. Preferably, the interrupter isolating blade 25 is formed from a flexible spring rod, coiled, as at 27, so as to be biased in a counterclockwise direction, as indicated by the arrow 28, toward the main switch blade 7. Thus, the circuit will pass through the interrupter isolating blade 25 to conducting housing 6 and finally through support casting 29 to line terminal connection plate 30.

As will become more clear hereinafter, engagement of the projection 12 by the tip end 11 of the main switch blade 7 causes rotation of the drive shaft 14 and actuation of the overcenter mechanism 15 to cause upward separating motion of the movable contact 19 (Fig. 3) away from the relatively stationary contact 18 to establish an arc there-between. A puffer assembly 31 is associated with the contacts 18, 19 to effect a blast of fluid, in this particular instance a gas such as sulfur hexafluoride, against the established arc to effect the extinction thereof.

Although sulfur hexafluoride gas is preferred, my invention is also operable with other gases. However, the invention has particular applicability where the gas is selected from the group consisting of sulfur hexafluoride and selenium hexafluoride, which may be used alone or admixed with at least one of the group of inert gases consisting of helium, carbon dioxide, air, nitrogen and argon.

The use of selenium hexafluoride as an arc-extinguishing medium is described and claimed in United States patent application filed September 14, 1954, Serial No. 455,976, now United States Patent 2,733,316 issued January 31, 1956 to Thomas E. Browne, Jr., Albert P. Strom and Harvey E. Spindle, and assigned to the assignee of the instant application.

Subsequently, a laterally extending arm 32, secured to and movable with the main switch blade 7, picks up the interrupter isolating blade 25 and carries the latter therewith to the fully open-circuit position of the device, as indicated by the broken lines 33 of Fig. 1. In this position, the crank arm 13 is in the position indicated by the broken lines 34. The interrupter is then fully open.

During the closing operation, the main switch blade 7, together with the interrupter isolating blade 25, swing in a counterclockwise direction about the shaft 35 of the hinged end 36 of the load-break switch, being biased together by the coiled portion 27. During this closing movement, the tip 24 of the interrupter isolating blade 25 first engages the forked end of the stationary terminal 23 at the top end of the circuit interrupting device 10. The circuit through the interrupter 5 is not closed, however, because of the separated condition of the contacts 18, 19 at this time. Further, counterclockwise, closing rotative travel of the main switch moving contact 7 causes the tip end 11 thereof to strike the projection 37, which in the position path of movement of the end 11 of the switch blade 7. As a result, the tip 11 of the switch blade 7 forces the projection 37, and hence the crank arm 13, in a clockwise direction about the drive shaft 14 to effect overcenter spring action of the toggle mechanism 15 within the housing 16, to effect thereby snap-closing motion of the movable contact 19 against the upper end of the stationary contact 18. This will complete the circuit through the interrupter 5, and continued travel of the main switch blade 7 will cause the contact end 8 thereof to slide between the spaced jaw contacts 9, making contact therewith. Final rotative closing motion of the rotatable insulator column 2 will effect axial rotative motion of the main switch blade 7 to bring the wider dimension of the contact 7 against the spaced jaws 9 to effect their expansion, and thereby bring high contact pressure to bear between the contacts 8, 9. This not only provides a low resistance path through the interrupter 5, but also effectively shorts out the circuit through the circuit interrupting device 10.

Figures 3, 7:
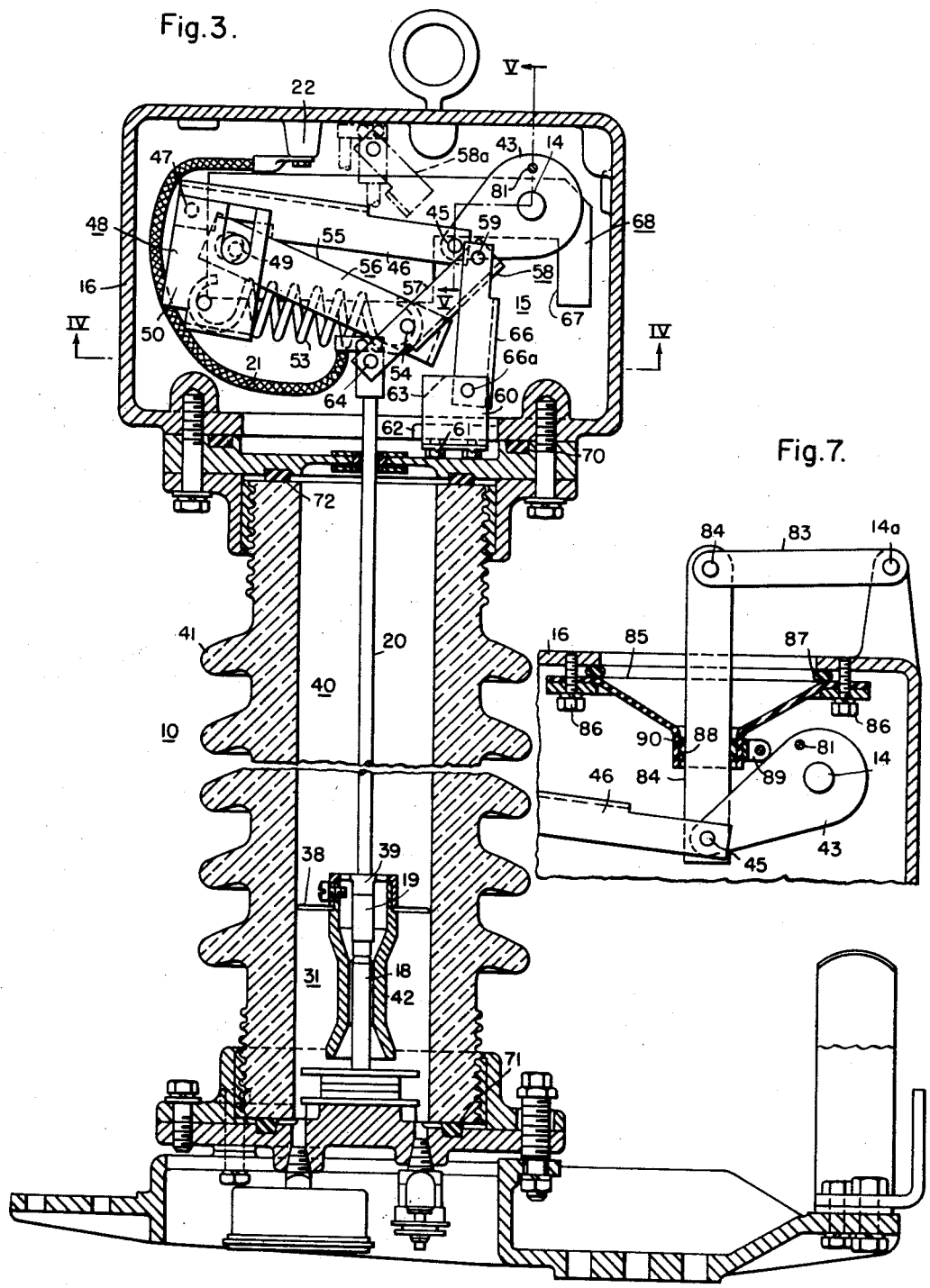
Fig. 3 is an enlarged, vertical sectional view through the interrupter casing of the load-break disconnecting switch of Fig. 1, showing the contact structure closed and a portion of the contact operating mechanism.
Fig. 7 illustrates a slightly different embodiment of my invention in which a longitudinally operable shaft is used to effect actuation of the contact separating mechanism.

The circuit interrupting device 10 is more clearly set out in Fig. 3 of the drawings. It will be noted that the puffer device 31 includes a movable piston 38, which is fixedly secured by a metallic spider member 39 to the movable contact 19 and moves therewith during the opening operation. The upward movement of the piston member 38 effects a compression of the gas within the region 40 at the upper end of the porcelain casing 41, and causes the same to pass through an orifice member 42 of insulating material to effect the extinction of the arc which is drawn between the separated contacts 18, 19.

The rotation of the shaft 14, by the switch blade 7, effects corresponding rotation of a crank plate 43 (Fig. 5), which is rigidly secured by any suitable means to the interior end 44 of the operating shaft 14. The crank plate 43 has a drive pin 45 affixed thereto, which is pivotally connected to a link 46, the other end of which is pivotally connected by a pin 47 to a U-shaped rotatable support 48, the latter being pivotally mounted upon a pair of bearing pins 49 stationarily secured within the casting 16 to the opposite side walls thereof, as more clearly viewed in Fig. 4 of the drawings. Thus, rotation of the shaft 14 effects through the drive pin 45 and drive link 46 corresponding rotation of the rotatable U-shaped support 48 about the bearing pins 49. Extending between the legs 50 of the U-shaped support 48 is a pin 51, encircled by spacers 52, and having attached thereto one end of a coiled tension spring 53. The other end of the tension spring 53 is fastened to a pin 54, the latter extending through the legs 55 of a U-shaped lever, generally designated by the reference numeral 56. The U-shaped lever 56 is also mounted upon the bearing pins 49, as shown in Fig. 4.

The pin 54 also extends through the sides 57 of a channel-shaped link 58, the latter being pivoted as at 59 to a guide lever 66. The other end of the link 58 is pivotally connected by a pin 64 to one end of the lift rod 20, and serves to actuate the same. The guide lever 66 is pivotally secured by a pin 66a extending between the legs 63 of a U-shaped bracket support 60. The bracket support 60 is mounted by bolts 61 to a tongue portion 62 integrally formed with the top housing casting 16 of the interrupter 10.

From the foregoing description, it will be apparent that counterclockwise rotation of the crank arm 13 during the opening operation, as effected by engagement between the tip end 11 of the switch blade 7 and the projection 12 will correspondingly effect through the link 46 clockwise rotative movement of the U-shaped rotatable support 48 to effect movement of one end of the tension spring 53 over the center of bearing pins 49. When the line of action of the tension spring 53 passes over the center of the mounting bearing pins 49 it will effect snap-opening rotative travel of the U-shaped lever 56 about the pins 49, thereby effecting through the floating link 58 upward snap-opening motion of the lift rod 20 of the interrupter 10. This will cause the upper end of the lift rod 20 to move to the dotted line position 20a, as shown in Fig. 3, with the floating link 58 assuming the position indicated by the dotted lines 58a in Fig. 3. The driving pin 45 will strike a depending portion 67 of a stop plate 68 to determine the upper limiting position of the rod 20.

During the closing operation, the clockwise rotation of the shaft 14, as caused by the tip 11 of the switch blade 7 striking the projection 37 of the crank arm 13, will cause through the link 46 counterclockwise rotation of the U-shaped rotatable support 48 to move the line of the action of the tension spring 53 over the center of the bearing pins 49 to effect snap-closing motion of the lift rod 20 and hence the movable contact 19.

Fig. 5 more clearly shows the sealing construction for the operating shaft 14, to which my invention is particularly directed. As mentioned before, sulfur hexafluoride gas, selenium hexafluoride gas, or any of the aforesaid gases is present within the interrupter 10 at say a pressure of 30 pounds per square inch. It is desired to seal the gas-filled interrupter housing at the factory. With permanent sealing there will normally not need to be any recharging with gas during the life of the switch. Also the location of the load-break switch 5 may be such as to render a recharging by personnel somewhat difficult. Hence there is a need for a permanent seal which will be gas, or fluid tight at temperatures ranging from +140° F. to −50° F.

With these extremes of temperature, the proper functioning of the gaskets is of utmost importance in maintaining the seal. In the past the several gaskets 69, 70, 71 and 72 have been made of polychloroprene. It has been observed that while polychloroprene does an excellent job of sealing at normal ambient temperatures, it loses its ability to maintain a gas-tight seal at temperatures slightly below zero. I have discovered that this difficulty may be overcome by the use of molded O-ring gaskets of silicone elastomers. Suitable examples of silicone elastomers, which may be used, are set out in an article in the May, 1947 issue of "Electrical Manufacturing" on pages 98, etc. The article, particularly on pages 99 and 100, indicates the compositions of suitable silicone rubbers or elastomers and their compounding and processing, together with methods for formation of elastomeric members. It is believed unnecessary to go into further details concerning such silicone rubbers. These silicone elastomers retain their elasticity and hence their sealing ability at temperatures below −50° F. Thus the gaskets 69–72 have been made of silicone elastomers.

For the rotating shaft seal, the method employed in the aforesaid Lingal patent of utilizing a flexible rubber-like sleeve encircling the shaft and having one end clamped to the casing with the other end of the rubber-like sleeve clamped to the interior shaft, difficulty has likewise been encountered at the very low temperatures of maintaining a gas-tight seal along the shaft. At low temperatures the rubber-like sleeve, which has heretofore been made of polychloroprene, has lost most of its resiliency and has permitted gas leakage along the shaft. To employ in place of the polychloroprene tubing, tubing of a silicone elastomer does not solve the problem since silicones basically are more readily permeable by gases than is polychloroprene, and the relatively large surface area of the thin wall tube can not be assembled by presently known methods to provide a gas-tight seal. There is hence the problem of having to use polychloroprene for the tube 73 with the very real probability of gas leakage at low temperatures. The polychloroprene tube is quite acceptable in all other respects such as resistance to $SF_6$ and $SeF_6$ permeability, torsion, etc., except the low temperature characteristics.

It was found that highly successful seals resulted by combining the polychloroprene tube 73 with O-rings 74 made from silicone elastomers since the silicone elastomers retain their elasticity and ability to follow expansion and contraction over wide extremes of temperature change. The O-rings 74 are retained in grooves 75 machined in the conical clamp 76 and in the beveled portion 77 of the covering plate 78. This construction has the advantage over the use of spring clamps and similar mechanical clamps because of the limitation of space in this type of device. Metal sleeves 82 surround the shaft 14 and prevent the tube 73 from frictionally binding to the shaft 14. This metal sleeve construction to prevent binding is described and claimed in United States patent application filed September 23, 1953, Serial Number 381,937, by James B. Owens and assigned to the assignee of the instant application. As shown in Fig. 5, the cover plate 78 is bolted by bolts 79 to the side of the housing casting 16. A sealing ring 80 is clamped by bolts 81 to the crank plate 43. Thus the O-ring of a silicone rubber is clamped between the metal and the polychloroprene flexible tube 73 and maintains a seal from the polychloroprene tube to the metal at all times.

During normal ambient temperatures the polychloroprene tube 73, clamped to the shaft 14 and to the housing 16, is quite adequate to maintain the seal.

However, during low temperatures when the polychloroprene tube hardens, and is unable to follow the metallic contraction because its own rate of contraction exceeds that of the metal, the O-ring 74 is still flexible and it maintains the seal between the polychloroprene tubing 73 and the metal. As the ambient temperature rises, the polychloroprene tube 73 again recovers its elasticity and its ability to gasket without the aid of O-rings 74. Hence, the O-ring 74 is a low temperature gasket for the polychloroprene tube and provides the spring characteristics necessary to permit use of the polychloroprene tube as the shaft sealing element.

This arrangement is used commercially in the production of load-break disconnecting switches 5 of the type set out herein, and test results show that the solution is quite adequate at all temperatures.

Although the particular application disclosed herein uses sulfur hexafluoride gas, selenium hexafluoride gas or mixtures including such gases and polychloroprene tubing 73 is the most satisfactory, nevertheless, for other similar applications, where other gases may be employed, any suitable flexible elastic tubing 73 of either natural or synthetic rubber may be satisfactory. Again to take care of the non-elastic condition which occurs during low temperatures, the O-rings 74 of a silicone rubber or elastomer are necessary.

Some of the various rubbers which may be employed for the tubing 73 are set out in an article in the December, 1953 issue of "Materials and Methods," pages 104, etc., and not only includes natural rubber, but butadiene-styrene synthetic rubber, acrylonitrile synthetic rubber, butyl synthetic rubber, polysulfide synthetic rubber as well as the polychloroprene synthetic rubbers. The polychloroprene has proven exceptionally satisfactory in the present $SF_6$ application. In the selection of a suitable tubing 73, it is merely necessary that the elastic, rubber-like tubing be nonpermeable to the enclosed gas. The O-rings or sealing gaskets of silicone rubber insure a fluid-tight connection at the very low temperatures.

From the foregoing description of my invention, it will be apparent that I have provided an improved sealing arrangement for rotating shaft seals. The tubing which encircles the shaft, and which is clamped to the housing as well as to the shaft end may be of any suitable rubber-like flexible non-permeable material, as mentioned, of either a natural or synthetic rubber. The O-ring, or additional gasketing, is preferably effected by the silicone rubbers or elastomers. The use of a silicone elastomer for the tubing 73 or the diaphragm 85, hereinafter described, is disclaimed, since for the present application it is permeable and relatively expensive. My invention is in part concerned with a shaft sealing arrangement in which the flexible rubber-like tubing 73 extending along the shaft is of a flexible rubber-like material other than of a silicone elastomer.

Although the sealing construction disclosed in the present application has been illustrated as applied to a gas-tight structure or device, it is to be clearly understood that such a sealing structure may be used with a movable shaft construction in a device which uses any fluid, the term fluid including gases, liquids, vapors and sprays. Thus, the improved seal may be employed with liquids as well as the gases as illustrated in the drawings.

Fig. 7 illustrates an application of the invention to the case of a longitudinally movable shaft or rod. Here the shaft 14a is connected to the crank arm 13, not shown, and is rotated exactly as before. A crank lever 83 is fixed to the shaft 14a. The outer end of the crank lever 83 is pivoted, as at 84, to a longitudinally movable operating rod 84, which is pivoted at 45 to the crank plate 43. Thus, the link 46 may be operated exactly as before.

A flexible, rubber-like diaphragm 85 is clamped to the upper wall of the casting 16 by bolts 86. The diaphragm 85 is preferably of a natural or synthetic rubber, as was the tube 73, although when $SF_6$ or $SeF_6$ is used, or mixtures thereof, as the contained gas, polychloroprene is preferred as the diaphragm material. Again the O-ring is a silicone rubber or elastomer. The inner portion of the diaphragm 85 is perforated and has a sleeve portion 88, which is clamped to the operating rod 84 by a clamp 89. Again an O-ring 90 of a silicone elastomer is interposed.

During low temperature operation the silicone rubber O-rings 87, 90 retain their elasticity and maintain the gastight seal even though the diaphragm 85 may harden.

Although I have shown and described specific structures, it is to be clearly understood that the same were merely for the purpose of illustration, and that changes and modifications may be readily made therein by those skilled in the art without departing from the spirit and scope of the invention.

I claim as my invention:

1. The combination in a circuit interrupter of a sealed gas-tight casing containing an arc-extinguishing gas, separable contacts disposed within the sealed casing, a mechanism for separating the contacts and disposed within the sealed casing, a rotatable operating shaft for actuating the mechanism extending through a wall of the sealed gas-tight casing, a gas impermeable, flexible, rubber-like sleeve less permeable than a silicone elastomer surrounding the rotatable shaft, one end of the sleeve being clamped to the casing, the other end of the sleeve being clamped adjacent the interior end of the rotatable shaft, and a ring-shaped seal of a silicone elastomer disposed between the rubber-like flexible sleeve and a portion of the rotatable shaft.

2. A circuit interrupter including a sealed casing containing gas comprising as its essential constituent a gas selected from at least one of the group consisting of $SF_6$ and $SeF_6$, arc-establishing means disposed internally within the sealed casing, a mechanism disposed internally within the sealed casing for actuating the arc-establishing means, a rotatable shaft for operating the mechanism extending through a wall of the casing, a sleeve of polychloroprene surrounding the rotatable shaft and clamped at one end to the casing, means clamping the other end of the sleeve adjacent the interior end of the rotatable shaft, and a ring-shaped seal of a silicone elastomer disposed between the sleeve of polychloroprene and a portion of the rotatable shaft.

3. A circuit interrupter including a sealed casing containing gas comprising as its essential constituent a gas selected from at least one of the group consisting of $SF_6$ and $SeF_6$, a rotatable shaft extending into the casing, a rubber-like flexible, gas impermeable sleeve other than a silicone elastomer surrounding the shaft, means clamping one end of the rubber-like flexible sleeve adjacent the interior end of the rotatable shaft, and a ring-shaped seal of a silicone elastomer disposed between the rubber-like flexible sleeve and a portion of the rotatable shaft.

4. The combination in a circuit interrupter of a sealed gas-tight casing containing gas comprising as its essential constituent a gas selected from at least one of the group consisting of $SF_6$ and $SeF_6$, separable contacts disposed within the sealed casing, a mechanism for separating the contacts and disposed within the casing, a rotatable operating shaft for actuating the mechanism extending through a wall of the sealed gas-tight casing, a gas impermeable, flexible, rubber-like sleeve less permeable than a silicone elastomer surrounding the rotatable shaft, one end of the sleeve being clamped to the casing, the other end of the sleeve being clamped adjacent the interior end of the rotatable shaft, and a ring-shaped seal of a silicone elastomer disposed between the rubber-like flexible sleeve and a portion of the rotatable shaft.

5. A sealed container containing gas comprising as its essential constituent a gas selected from at least one of the group consisting of $SF_6$ and $SeF_6$, a movable member extending into the sealed container, a chloroprene member surrounding the movable member and having one portion thereof clamped to the container, another portion of the chloroprene member being clamped to the movable member, and a ring-shaped seal of a silicone elastomer disposed between the chloroprene member and a portion of the movable member.

6. A sealed container containing gas comprising as its essential constituent a gas selected from at least one of the group consisting of $SF_6$ and $SeF_6$, a movable member extending into the sealed container, a flexible, rubber-like member less permeable to said contained gas than a silicone elastomer surrounding the movable member and having one portion thereof clamped to the container, another portion of the flexible rubber-like member being clamped to the movable member, and a ring-shaped seal of a silicone elastomer disposed between the flexible, rubber-like member and a portion of the movable member.

7. A sealed container containing $SF_6$, a movable member extending into the sealed container, a flexible, rubber-like, member less permeable to said contained gas than a silicone elastomer surrounding the movable member and having one portion thereof clamped to the container, another portion of the flexible, rubber-like member being clamped to the movable member, and a ring-shaped seal of a silicone elastomer disposed between the flexible, rubber-like member and a portion of the movable member.

8. A sealed container containing $SF_6$, a movable member extending into the sealed container, a flexible, rubber-like sleeve less permeable to said contained gas than a silicone elastomer surrounding the movable member and having one portion thereof clamped to the container, another portion of the flexible, rubber-like sleeve being clamped to the movable member, and a ring-shaped seal of a silicone elastomer disposed between the flexible, rubber-like sleeve and a portion of the movable member.

9. A sealed container containing a gaseous fluid medium, a movable member extending within said sealed container and adaptable for transmitting motion from the interior of said container to the exterior thereof, a gas-tight seal for said movable member including a first flexible, rubber-like gaseous impermeable member other than a silicone elastomer clamped to said container and also to said movable member, said first flexible, rubber-like gaseous impermeable member having the characteristic of somewhat losing its elasticity and hence sealing properties at low temperature, said gas-tight seal also including a second ring-shaped flexible rubber-like member of a silicone elastomer having the characteristic of retaining its elasticity and hence sealing character at the aforesaid low temperature, and said second ring-shape flexible rubber-like member being disposed between the first said flexible, rubber-like gaseous impermeable member and said movable member at the point of clamping engagement.

References Cited in the file of this patent

UNITED STATES PATENTS

| | | |
|---|---|---|
| 429,611 | Facer | June 10, 1890 |
| 845,373 | Payne | Feb. 26, 1907 |
| 2,428,932 | Fawick | Oct. 14, 1947 |